(12) United States Patent
Nourbakhsh et al.

(10) Patent No.: US 9,008,300 B2
(45) Date of Patent: Apr. 14, 2015

(54) COMPLEX RECORDING TRIGGER

(75) Inventors: Illah R. Nourbakhsh, Pittsburgh, PA (US); Joseph Watson, Alpharetta, GA (US)

(73) Assignee: Verint Americas Inc, Alpharetta, GA (US)

( * ) Notice: Subject to any disclaimer, the term of this patent is extended or adjusted under 35 U.S.C. 154(b) by 2001 days.

(21) Appl. No.: 11/361,208

(22) Filed: Feb. 24, 2006

(65) Prior Publication Data

US 2007/0201675 A1     Aug. 30, 2007

(51) Int. Cl.
    *H04M 3/00*       (2006.01)
    *H04M 3/51*       (2006.01)

(52) U.S. Cl.
    CPC ...... *H04M 3/5175* (2013.01); *H04M 2203/402* (2013.01)

(58) Field of Classification Search
    CPC .................. H04M 3/5175; H04M 2203/402
    USPC ............. 379/265.06, 265.01, 265.02; 705/11; 340/286.02; 704/7.42
    See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,684,349 A | 8/1987 | Ferguson et al. |
| 5,101,402 A | 3/1992 | Chiu et al. |
| 5,267,865 A | 12/1993 | Lee et al. |
| 5,311,422 A | 5/1994 | Loftin et al. |
| 5,511,165 A | 4/1996 | Brady et al. |
| 5,526,407 A | 6/1996 | Russell et al. |
| 5,581,614 A | 12/1996 | Ng et al. |
| 5,597,312 A | 1/1997 | Bloom et al. |
| 5,710,591 A | 1/1998 | Bruno et al. |
| 5,717,879 A | 2/1998 | Moran et al. |
| 5,742,736 A | 4/1998 | Haddock |
| 5,790,798 A | 8/1998 | Beckett, II et al. |
| 5,809,250 A | 9/1998 | Kisor |
| 5,825,869 A | 10/1998 | Brooks et al. |
| 5,926,836 A | 7/1999 | Blumenau |
| 5,958,016 A | 9/1999 | Chang et al. |
| 5,964,836 A | 10/1999 | Rowe et al. |
| 5,970,455 A | 10/1999 | Wilcox et al. |
| 5,978,648 A | 11/1999 | George et al. |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A * | 5/2000 | Pattison et al. .......... 379/265.06 |
| 6,061,798 A | 5/2000 | Coley et al. |
| 6,076,099 A | 6/2000 | Chen et al. |
| 6,078,894 A | 6/2000 | Clawson et al. |

(Continued)

OTHER PUBLICATIONS

"Customer Spotlight: Navistar International," Web page, unverified print date of Apr. 1, 2002.

(Continued)

*Primary Examiner* — Sonia Gay
(74) *Attorney, Agent, or Firm* — Meunier Carlin & Curfman

(57) ABSTRACT

Complex recording triggers are provided. As an example of a system and method, the volume of call records can be reduced by complex recording triggers, thereby reducing the storage space allocated for call records.

14 Claims, 6 Drawing Sheets

(56) References Cited

U.S. PATENT DOCUMENTS

| | | | |
|---|---|---|---|
| 6,108,711 A | 8/2000 | Beck et al. | |
| 6,115,751 A | 9/2000 | Tam et al. | |
| 6,122,665 A | 9/2000 | Bar et al. | |
| 6,122,668 A | 9/2000 | Teng et al. | |
| 6,138,139 A | 10/2000 | Beck et al. | |
| 6,144,991 A | 11/2000 | England | |
| 6,146,148 A | 11/2000 | Stuppy | |
| 6,154,771 A | 11/2000 | Rangan et al. | |
| 6,157,808 A | 12/2000 | Hollingsworth | |
| 6,171,109 B1 | 1/2001 | Ohsuga | |
| 6,182,094 B1 | 1/2001 | Humpleman et al. | |
| 6,195,679 B1 | 2/2001 | Bauersfeld et al. | |
| 6,201,948 B1 | 3/2001 | Cook et al. | |
| 6,211,451 B1 | 4/2001 | Tohgi et al. | |
| 6,225,993 B1 | 5/2001 | Lindblad et al. | |
| 6,230,197 B1 | 5/2001 | Beck et al. | |
| 6,236,977 B1 | 5/2001 | Verba et al. | |
| 6,244,758 B1 | 6/2001 | Solymar et al. | |
| 6,286,030 B1 | 9/2001 | Wenig et al. | |
| 6,286,046 B1 | 9/2001 | Bryant | |
| 6,288,753 B1 | 9/2001 | DeNicola et al. | |
| 6,289,340 B1 | 9/2001 | Puram et al. | |
| 6,301,462 B1 | 10/2001 | Freeman et al. | |
| 6,301,573 B1 | 10/2001 | McIlwaine et al. | |
| 6,324,282 B1 | 11/2001 | McIllwaine et al. | |
| 6,336,093 B2 | 1/2002 | Fasciano | |
| 6,347,374 B1 | 2/2002 | Drake et al. | |
| 6,351,467 B1 | 2/2002 | Dillon | |
| 6,370,574 B1 | 4/2002 | House et al. | |
| 6,404,857 B1 | 6/2002 | Blair et al. | |
| 6,408,064 B1 | 6/2002 | Fedorov et al. | |
| 6,418,471 B1 | 7/2002 | Shelton et al. | |
| 6,421,427 B1 | 7/2002 | Hill et al. | |
| 6,437,818 B1 | 8/2002 | Ludwig et al. | |
| 6,445,776 B1 | 9/2002 | Shank et al. | |
| 6,453,345 B2 | 9/2002 | Trcka et al. | |
| 6,459,787 B2 | 10/2002 | McIllwaine et al. | |
| 6,493,758 B1 | 12/2002 | McLain | |
| 6,502,131 B1 | 12/2002 | Vaid et al. | |
| 6,510,220 B1 | 1/2003 | Beckett, II et al. | |
| 6,510,469 B1 | 1/2003 | Starnes et al. | |
| 6,535,909 B1 | 3/2003 | Rust | |
| 6,542,602 B1 | 4/2003 | Elazar | |
| 6,543,004 B1 | 4/2003 | Cagle et al. | |
| 6,546,405 B2 | 4/2003 | Gupta et al. | |
| 6,583,806 B2 | 6/2003 | Ludwig et al. | |
| 6,584,179 B1 | 6/2003 | Fortier et al. | |
| 6,603,854 B1 | 8/2003 | Judkins et al. | |
| 6,604,093 B1 | 8/2003 | Etzion et al. | |
| 6,606,657 B1 | 8/2003 | Zilberstein et al. | |
| 6,665,644 B1 | 12/2003 | Kanevsky et al. | |
| 6,674,447 B1 | 1/2004 | Chiang et al. | |
| 6,683,633 B2 | 1/2004 | Holtzblatt et al. | |
| 6,697,858 B1 | 2/2004 | Ezerzer et al. | |
| 6,724,887 B1 | 4/2004 | Eilbacher et al. | |
| 6,738,456 B2 | 5/2004 | Wrona et al. | |
| 6,757,361 B2 | 6/2004 | Blair et al. | |
| 6,772,214 B1 | 8/2004 | McClain et al. | |
| 6,772,396 B1 | 8/2004 | Cronin et al. | |
| 6,775,377 B2 | 8/2004 | McIllwaine et al. | |
| 6,785,370 B2 | 8/2004 | Glowny et al. | |
| 6,792,575 B1 | 9/2004 | Samaniego et al. | |
| 6,810,414 B1 | 10/2004 | Brittain | |
| 6,820,083 B1 | 11/2004 | Nagy et al. | |
| 6,823,384 B1 | 11/2004 | Wilson et al. | |
| 6,870,916 B2 | 3/2005 | Henrikson et al. | |
| 6,901,438 B1 | 5/2005 | Davis et al. | |
| 6,915,314 B2 | 7/2005 | Jackson et al. | |
| 6,937,706 B2 | 8/2005 | Bscheider et al. | |
| 6,959,078 B1 | 10/2005 | Eilbacher et al. | |
| 6,965,886 B2 | 11/2005 | Govrin et al. | |
| 6,993,494 B1 | 1/2006 | Boushy et al. | |
| 7,003,517 B1 | 2/2006 | Seibel et al. | |
| 7,047,297 B2 | 5/2006 | Huntington et al. | |
| 7,337,155 B2 * | 2/2008 | Yoshida | 706/15 |
| 7,385,479 B1 * | 6/2008 | Green et al. | 340/286.02 |
| 8,199,900 B2 * | 6/2012 | Barnett | 379/265.03 |
| 2001/0000962 A1 | 5/2001 | Rajan | |
| 2001/0014143 A1 | 8/2001 | Kuhn | |
| 2001/0032335 A1 | 10/2001 | Jones | |
| 2001/0043697 A1 | 11/2001 | Cox et al. | |
| 2002/0038363 A1 | 3/2002 | MacLean | |
| 2002/0052948 A1 | 5/2002 | Baudu et al. | |
| 2002/0065911 A1 | 5/2002 | Von Klopp et al. | |
| 2002/0065912 A1 | 5/2002 | Catchpole et al. | |
| 2002/0112048 A1 | 8/2002 | Gruyer et al. | |
| 2002/0128925 A1 | 9/2002 | Angeles | |
| 2002/0143925 A1 | 10/2002 | Pricer et al. | |
| 2002/0165954 A1 | 11/2002 | Eshghi et al. | |
| 2002/0184527 A1 | 12/2002 | Chun et al. | |
| 2003/0055883 A1 | 3/2003 | Wiles et al. | |
| 2003/0079020 A1 | 4/2003 | Gourraud et al. | |
| 2003/0140121 A1 | 7/2003 | Adams | |
| 2003/0144900 A1 | 7/2003 | Whitmer | |
| 2003/0154240 A1 | 8/2003 | Nygren et al. | |
| 2004/0100507 A1 | 5/2004 | Hayner et al. | |
| 2004/0138944 A1 * | 7/2004 | Whitacre et al. | 705/11 |
| 2004/0165717 A1 | 8/2004 | McIlwaine et al. | |
| 2004/0249650 A1 | 12/2004 | Freedman et al. | |
| 2005/0114224 A1 * | 5/2005 | Hodges et al. | 705/26 |
| 2005/0138560 A1 | 6/2005 | Lee et al. | |
| 2005/0240656 A1 | 10/2005 | Blair | |
| 2006/0165003 A1 | 7/2006 | Partridge | |
| 2007/0174111 A1 * | 7/2007 | Anderson et al. | 705/11 |

OTHER PUBLICATIONS

"DKSystems Integrates QM Perception with OnTrack for Training," Web page, unverified print date of Apr. 1, 2002, unverified cover date of Jun. 15, 1999.

"OnTrack Online" Delivers New Web Functionality, Web page, unverified print date of Apr. 2, 2002, unverified cover date of Oct. 5, 1999.

"PriceWaterhouseCoopers Case Study: The Business Challenge," Web page, unverified cover date of 2000.

Abstract, net.working: "An Online Webliography," *Technical Training* pp. 4-5 (Nov./Dec. 1998).

Adams et al., "Our Turn-of-the-Century Trend Watch" *Technical Training* pp. 46-47 (Nov./Dec. 1998).

Barron, "The Road to Performance: Three Vignettes," *Technical Skills and Training* pp. 12-14 (Jan. 1997).

Bauer, "Technology Tools: Just-in-Time Desktop Training is Quick, Easy, and Affordable," *Technical Training* p. 8 (May/Jun. 1998).

Beck et al., "Applications of AI in Education," *AMC Crossroads* vol. 1:1-13 (Fall 1996), Web page, unverified print date of Apr. 12, 2002.

Benson and Cheney, "Best Practices in Training Delivery," *Technical Training* pp. 14-17 (Oct. 1996).

Bental and Cawsey, "Personalized and Adaptive Systems for Medical Consumer Applications," *Communications ACM* 45(5):62-63 (May 2002).

Benyon and Murray, "Adaptive Systems: from intelligent tutoring to autonomous agents," pp. 1-52, Web page, unknown date.

Blumenthal et al., "Reducing Development Costs with Intelligent Tutoring System Shells," pp. 1-5, Web page, unverified print date of Apr. 9, 2002, unverified cover date of Jun. 10, 1996.

Brusilosky et al., "Distributed intelligent tutoring on the Web," Proceedings of the 8th World Conference of the AIED Society, Kobe, Japan, Aug. 18-22, pp. 1-9 Web page, unverified print date of Apr. 12, 2002, unverified cover date of Aug. 18-22, 1997.

Brusilovsky and Pesin, ISIS-Tutor: An Intelligent Learning Environment for CD/ISIS Users, @ pp. 1-15 Web page, unverified print date of May 2, 2002.

Brusilovsky, "Adaptive Educational Systems on the World-Wide-Web: A Review of Available Technologies," pp. 1-10, Web Page, unverified print date of Apr. 12, 2002.

Byrnes et al., "The Development of a Multiple-Choice and True-False Testing Environment on the Web," pp. 1-8, Web page, unverified print date Apr. 12, 2002, unverified cover date of 1995.

Calvi and De Bra, "Improving the Usability of Hypertext Courseware through Adaptive Linking," *ACM*, unknown page numbers (1997).

(56) References Cited

OTHER PUBLICATIONS

Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Apr. 12, 2002, unverified cover date of 2001.
Cole-Gomolski, "New ways to manage E-Classes," *Computerworld* 32(48):4344 (Nov. 30, 1998).
Cross, "Sun Microsystems—the SunTAN Story," Internet Time Group 8 (©2001).
Cybulski and Linden, "Teaching Systems Analysis and Design Using Multimedia and Patterns," unknown date, unknown source.
De Bra et al., "Adaptive Hypermedia: From Systems to Framework," *ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report," *Educational Technical* pp. 7-16 (Mar. 1992).
Diessel et al., "Individualized Course Generation: A Marriage Between CAL and ICAL," *Computers Educational* 22(1/2)57-64 (1994).
Dyreson, "An Experiment in Class Management Using the World-Wide Web," pp. 1-12, Web page, unverified print date of Apr. 12, 2002.
E Learning Community, "Excellence in Practice Award: Electronic Learning Technologies," *Personal Learning Network* pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning*, THINQ Limited, London, Version 1.0 (2000).
Eline, "A Trainer's Guide to Skill Building," *Technical Training* pp. 34-37 and 41 (Sep./Oct. 1998).
Eline, "Case Study: Bridging the Gap in Canada's IT Skills," *Technical Skills and Training* pp. 23-25 (Jul. 1997).
Eline, "Case Study: IBT's Place in the Sun," *Technical Training* pp. 12-14 and 16-17 (Aug./Sep. 1997).
Fritz, "CB templates for productivity: Authoring system templates for trainers," *Emedia Professional* 10(8):6876 (Aug. 1997).
Fritz, "ToolBook II: Asymetrix's updated authoring software tackles the Web," *Emedia Professional* 10(2):102106 (Feb. 1997).
Gibson et al., "A Comparative Analysis of Web-Based Testing and Evaluation Systems," pp. 1-8, Web page, unverified print date of Apr. 11, 2002.
Hallberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Holtman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3):5053 (Mar. 1998).
Larson, "Enhancing Performance Through Customized Online Learning Support," *Technical Skills and Training* pp. 25-27 (May/Jun. 1997).
Linton et al., "OWL: A Recommender System for Organization-Wide Learning," *Educational Technical Society* 3(1):62-76 (2000).
Lucadamo and Cheney, "Best Practices in Technical Training," *Technical Training* pp. 21-26 (Oct. 1997).
McNamara, "Monitoring Solutions: Quality Must Be Seen and Heard," *Inbound/Outbound* pp. 66-67 (Dec. 1989).
Merrill, "The New Component Design Theory: Instruction design for courseware authoring," *Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," *Trans. IEICE* E73(3):297-307 (Mar. 1990).
Mostow and Aist, "The Sounds of Silence: Towards Automated Evaluation of Student Learning a Reading Tutor that Listens" *American Association for Artificial Intelligence*, Web page, unknown date 8 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc., USA.
Nelson et al., "The Assessment of *End-User Training Needs,*" *Communications ACM* 38(7):27-39 (Jul. 1995).
O'Herron, "CenterForce Technologies' CenterForce Analyzer," Web page, unverified print date of Mar. 20, 2002, unverified cover date of Jun. 1, 1999.
O'Roark, "Basic Skills Get a Boost," *Technical Training* pp. 10-13 (Jul./Aug. 1998).
Pamphlet, "On Evaluating Educational Innovations[1]," authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web product," Web page, unverified print date of Apr. 1, 2002.
Phaup, "QM Perception™ Links with Integrity Training's WBT Manager™ to Provide Enhanced Assessments for Web-Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: University of California assist with Beta Testing, Server scripts now available to high-vol. users," Web page, unverified print date of Apr. 1, 2002, unverified cover date of May 6, 1996.
Piskurich, "Now-You-See-'Em, Now-You-Don't Learning Centers," *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," *Journal of Instructional Development* 7(3):17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *InfoWorld* 20(36):7276 (1998).
Untitled, 10th Mediterranean Electrotechnical Conference vol. I pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).

(56) References Cited

OTHER PUBLICATIONS

Witness Systems promotional brochure for eQuality entitled "Bringing eQuality to eBusiness".

Witness Systems promotional brochure for eQuality entitled "Building Customer Loyalty Through Business-Driven Recording of Multimedia Interactions in your Contact Center," (2000).

* cited by examiner

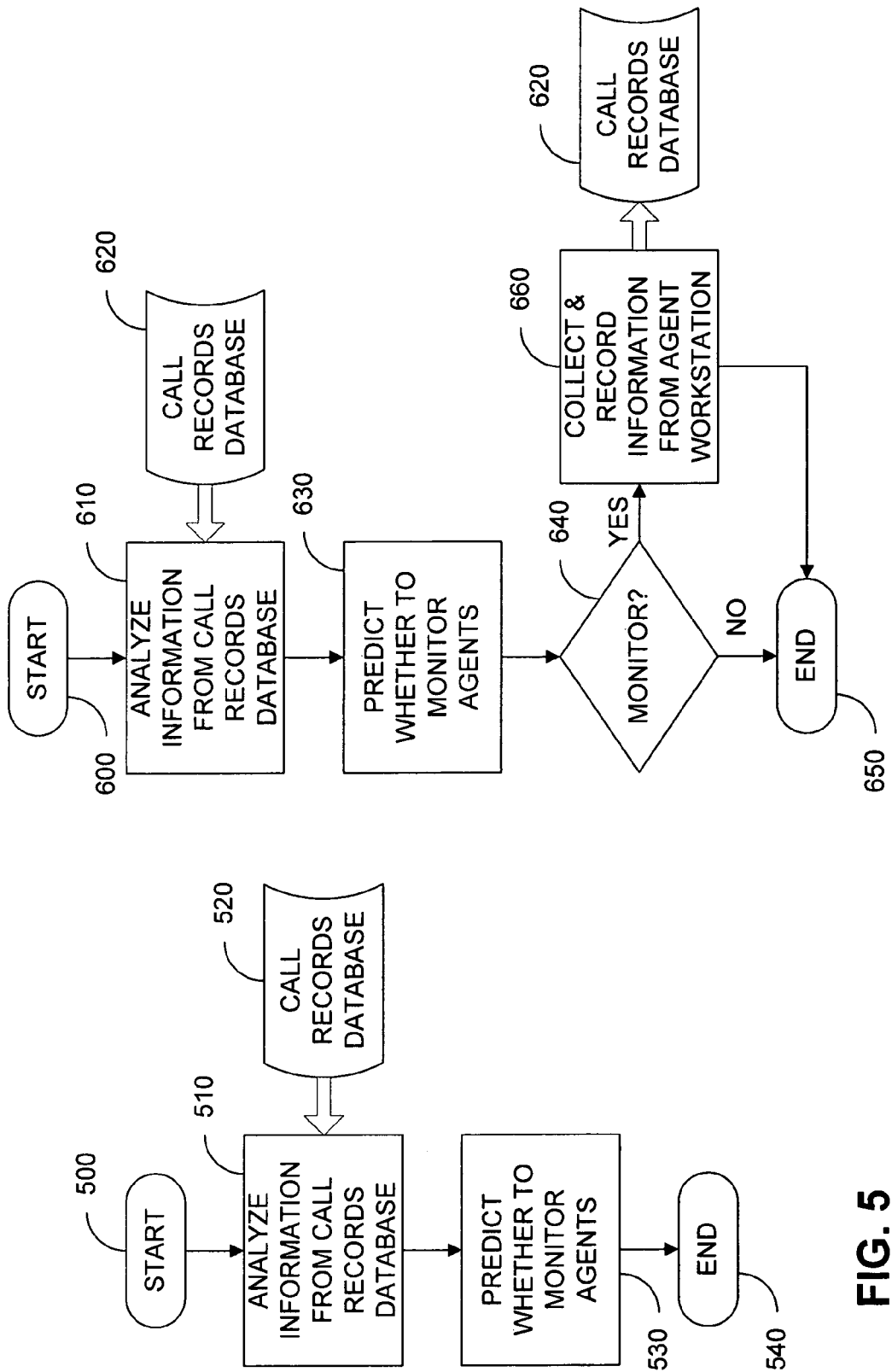

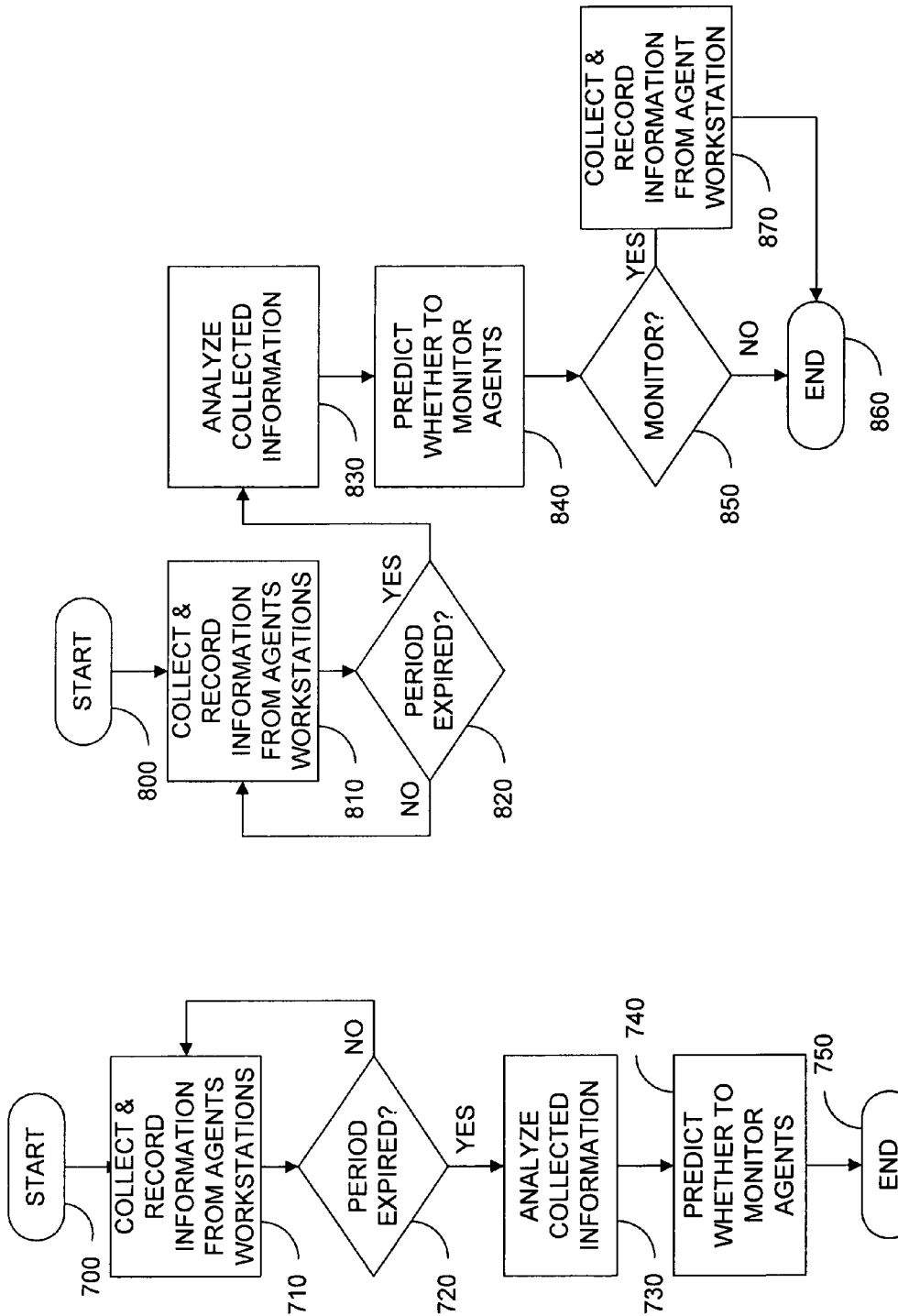

COMPLEX RECORDING TRIGGER

CROSS-REFERENCE

This application incorporates by reference pending application Ser. No. 11/166,630, which is a continuation-in-part of application Ser. No. 10/118,848, filed Apr. 8, 2002, which is a continuation-in-part of application Ser. No. 09/212,900, which issued as U.S. Pat. No. 6,370,574, and of Ser. No. 10/058,911, filed Jan. 28, 2002, each of which are hereby incorporated by reference.

BACKGROUND AND SUMMARY

This disclosure relates to computer-telephony integration systems and methods, and more particularly to systems and methods for voice and data recording and monitoring of a computer workstation.

In some business environments, computers are used in conjunction with telephones in order to provide services. For example, in providing credit card-related services, it is known to provide customer service representatives (hereinafter referred to as "agents" or "employees"), with access to a computer workstation as well as a telephone. In the process of providing telephonic service from the agent to the customer, a customer can contact the agent (or vice versa) through a telephone connection, and the customer and the agent will discuss matters relating to the customer's account over the telephone.

During such telephone calls, in order to provide supportive information regarding the customer's account, it is likewise conventional to provide the customer's account information at the agent's workstation. As an example, in the instance of credit card services, it is conventional to provide the agent's computer with information such as the customer's outstanding balance, the amount last paid, etc. It is also known to provide the agent with access to a database including certain fields, to which the agent can input data responsive to the telephone conversation. For example, the agent may wish to insert data to indicate that the customer has promised payment by a certain date, or that certain special attention should be given to the customer for any reason.

Such agents are often provided in groups, referred to as "call centers". In certain instances, such call centers may have as many as 200 "agents" in a group, each having their own telephone extension, and each likewise having their own computer workstation having a monitor (or "screen"), which provides video signals responsive to various commands.

In order to provide supervision of such agents, it is often desired to allow an agent's supervisor (hereinafter "supervisor"), with a way to monitor the screen and voice activities of such agents during their-telephone conversations. Such monitoring of a "monitored workstation" may be considered quality control of the agent's services. For example, it is worthwhile for a supervisor to know if an agent is using his/her computer time efficiently (not moving back and forth from various screens or applications unnecessarily), or is rude or discourteous while on the telephone. Such information can be determined by having a supervisor "look over the shoulder" of an agent, viewing his/her computer activities as well as listening to the telephone conversations; however, due to human nature this tends to be an ineffective practice as an agent will tend to be "on guard" while being monitored, which may not provide the supervisor with a good example of how the agent normally would conduct his/her duties when not being monitored. For example, the agent could become nervous and not perform as well as normal if he/she knows he/she is being monitored.

Monitoring systems have been developed which transparently monitor the agent(s). These monitoring systems record the activities of the agent(s), making the records available for supervisor review, training, and provide an audit trail for transactions entered by the agent(s). However, monitoring a large number of phones can produce an enormous volume of call records. It can be expensive to set up a system to record and maintain such a large volume of calls.

In accordance with this disclosure, systems and methods for complex recording triggers are provided. As an example of a system and method, the volume of call records can be cut down by complex recording triggers, thereby reducing the storage space allocated for call records. As another example, a system and method can be configured to predict whether an agent should be monitored, such that the call records are maintained with reference to specific agents.

Other features and advantages of the present disclosure will become apparent upon reading the following detailed description of the disclosure when taken in conjunction with the drawings and claims.

BRIEF DESCRIPTION OF THE DRAWINGS

FIG. 5 is a flowchart illustrating an operational scenario for a complex recording trigger.

FIG. 6 is a flowchart illustrating a second operational scenario for a complex recording trigger.

FIG. 7 is a flowchart illustrating a third operational scenario for a complex recording trigger.

FIG. 8 is a flowchart illustrating a fourth operational scenario for a complex recording trigger.

DETAILED DESCRIPTION

Figure 1:
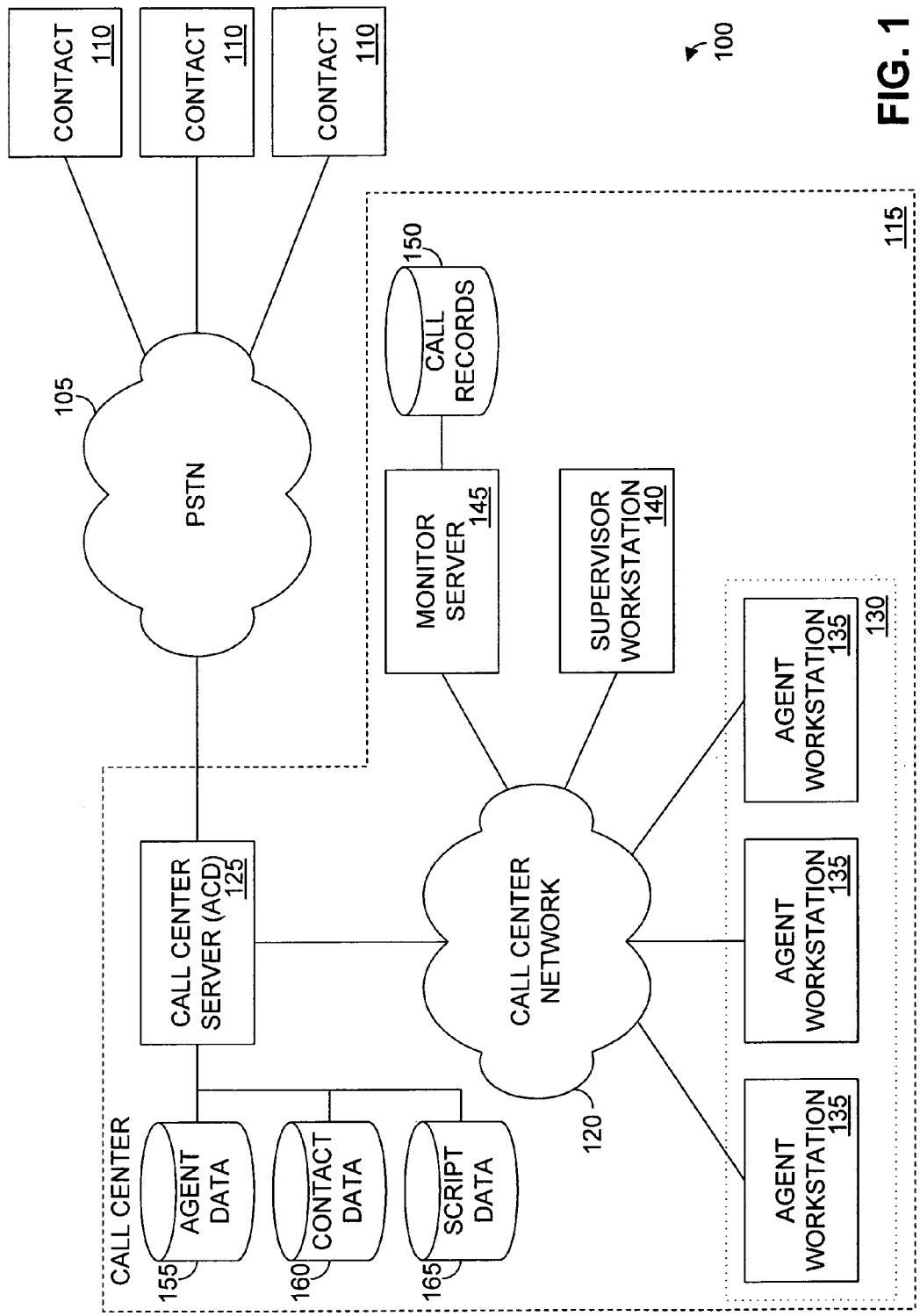
FIG. 1 is a block diagram illustrating an example environment where a complex recording trigger may be used.
Figure 2:
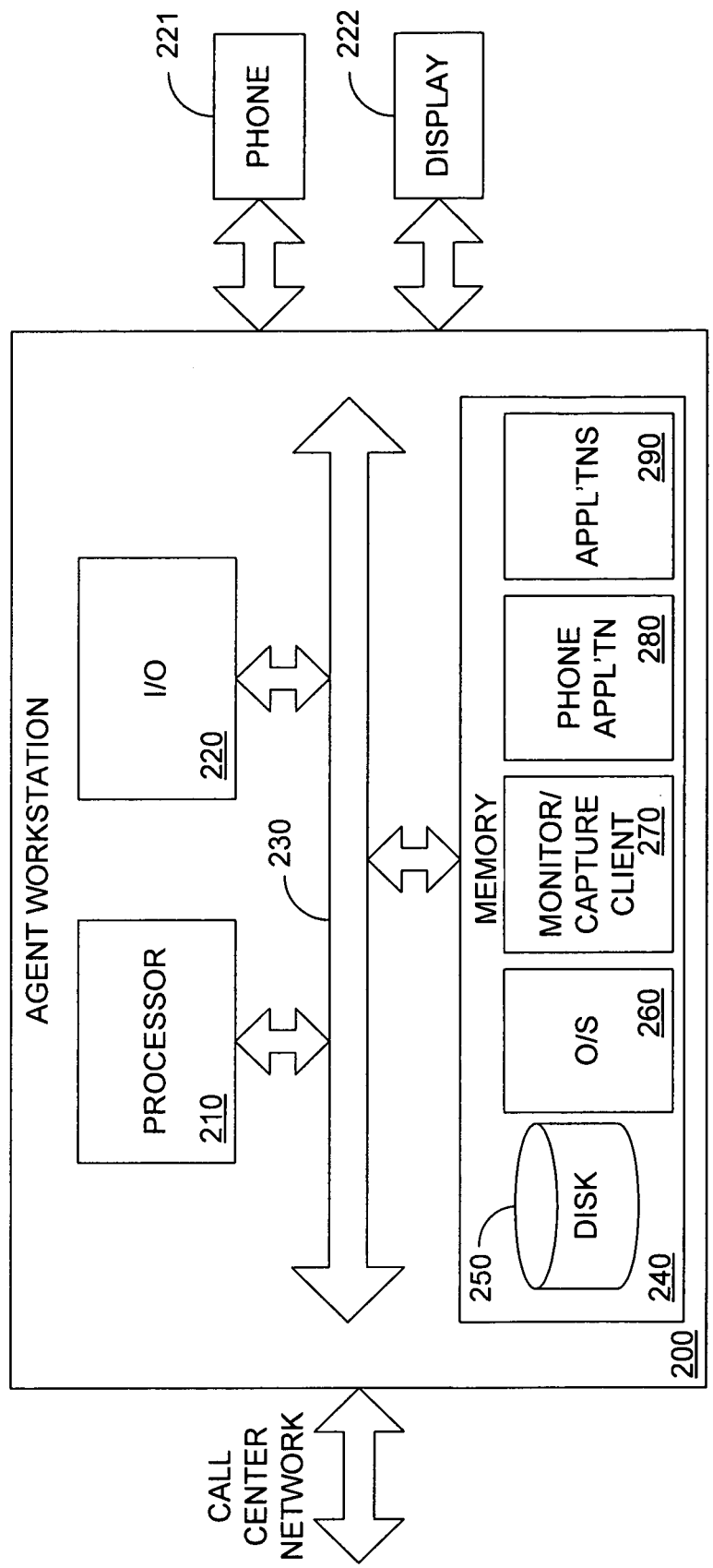
FIG. 2 is a block diagram illustrating an agent workstation including monitor and capture clients used to monitor and/or record activity occurring on the agent workstation.

Reference is now made to FIG. 1, which illustrates a configuration 100 according to the present disclosure. As shown, the configuration 100 includes a public switched telephone network (PSTN) 105, connecting a plurality of contacts 110 to an interaction center 115 (e.g., a call center). The call center 115 can include an internal voice/data network 120, to which is attached a server 125, a group 130 of monitored workstations 135 (e.g., agent workstations), a monitoring workstation 140 (e.g., supervisor workstation), and a monitor server 145. Networking between these elements may be done through TCP/IP protocols, although other network protocols may be used without departing from the scope of the present disclosure.

On-screen activities conducted at the monitored workstation 135 can be viewed (or "monitored") by the supervisor on the screen of the monitoring workstation 140 either in real time (i.e., as the activities are actually occurring), and/or the on-screen activities conducted at the monitored workstation 135 can be recorded by the monitor server 145 to a call records database 150 and "played back" at the monitoring workstation 140 at a later time. These activities may be played back much as one would play back the video tape of a television program, that is the on-screen and synchronized voice activities that occurred at the monitored workstation 135 may allowed to "play" at the monitoring workstation 140 substantially as they previously actually happened, portions may be replayed, the activities may be stopped or "paused" for particular review, and certain portions may be skipped if so desired.

It should be understood that the call center server 125 is configured to receive and route telephone calls received via the public switched telephone network 105 from contacts 110 to any of a number of agent workstations 135 via the internal call center network 120. The call center server 125 can perform the functions of an automatic call distribution system, for example, by retrieving contact data from the contact database 155 and analyzing agent data from an agent data database 160 to determine which of the agents working at the agent workstations 135 should receive an incoming call from a contact 110. Moreover, the call center server 125 can provide script data stored in a script data database 165 to the agent workstation to assist the agent in communicating with the contact. Where the call center is a technical assistance center for a product, the script could be a troubleshooting manual which gives the agent several possible problems and solutions for the symptoms specified by the contact. It should be noted, however, that the script could be implemented in many different ways, such as, for example, a web page. Moreover, the script could be stored on the agent workstation rather than the call center server.

The software on the monitor server 145 can be configured to send data polls to software installed and running on the agent workstation 135. It should be understood, however, that the agent workstation 135 can be configured to provide the updates to the monitor without prompting from the monitor server 145. The software on the agent workstation 135 can intercept workstation data, by "hooking" or "scraping." Hooking operates by capturing operating system graphics primitives relevant to actual screen display, and either returns selected screen portions (referred to as "changed regions") which have changed since the last data poll. The changed regions are displayable at a remote location in real time or can be recorded for display at a remote location at a later time. The technique is substantially "passive" in that it preferably does not perceptibly interfere with the operation of the agent's workstation which would be a signal to the agent that he or she is being monitored.

As mentioned above, the monitor could also use a "scraping" technique. The "scraping" can occur in response to a poll. When the poll is received; the full screen is grabbed and compared (such as by an XOR operation) to a previously grabbed screen, and changed regions including the screen differences are sent over the network to the server. In one implementation, the first and last "differences" in the XOR comparison are determined, and all data therebetween is considered within the changed region, which is not necessarily rectangular. However, it should be recognized that the entire screen or portions of the screen could be sent over the network using either the "hooking" or "scraping" techniques, or the primitive graphics commands themselves, or any other technique operable communicate the agent's activities for recording may be sent in accordance with the present disclosure.

In order to provide consistent and acceptable service to contacts, systems can monitor both the "desktop" screen display and the telephonic habits of the agents, in order to properly train agents and to provide quality control of the agent's services. Moreover, the computer activities of the agent are synchronized with the telephone communication of the agent. Thus, a later viewer (e.g., the supervisor) could view the agent's activities and listen to the conversation substantially as it occurred in real time.

Figure 3:
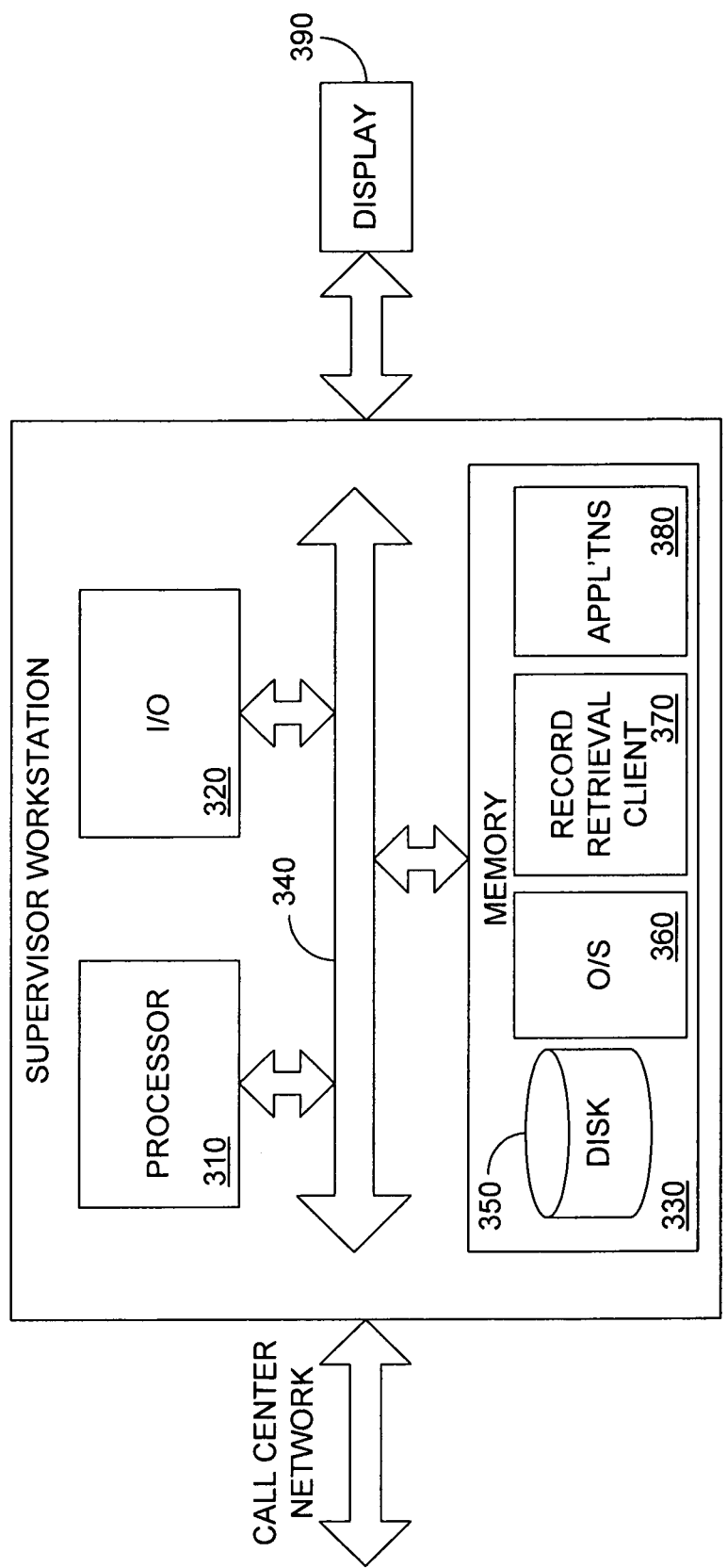
FIG. 3 is a block diagram illustrating a supervisor workstation used to review agent activity.

FIG. 3 is a block diagram of a monitored workstation 200 and includes hardware (processor 210, I/O 220, bus 230, memory 240, disk 250, etc.) and software (operating system (O/S) 260, monitor/capture client 270, phone application 280, and other applications 290) mounted thereon. A telephone signal 221 may be routed through the workstation 200, as shown. Such a configuration could help to facilitate the capture and synchronization of the display data 222 and the voice data 221. However, it should be noted that a telephone signal could be provided independently from the agent's computer through the use of an independent telephone extension.

The hardware used can be personal computer (PC) hardware such as that used to operate OS/2 available from IBM Corporation of White Plains, N.Y., or Windows available from Microsoft Corporation of Redmond, Wash. However, it should be understood that different hardware configurations may be used without departing from the spirit and scope of the present disclosure.

The workstation 200 is loaded with and runs a graphics user interface such as, for example, OS/2 (indicated generally as 260 and defined by the dotted line). However, it should be noted that the scope of this disclosure is not limited to a particular operating system. For example, the teachings of the present disclosure can be applied to any number of operating systems, including, but not limited to, OS/2, Windows, Unix-type operating systems such as available from Sun Microsystems of Santa Clara, Calif., Linux available from RedHat Corporation of Raleigh, N.C., Mac OS X available from Apple Computer, Inc. of Cupertino, Calif., among many others. As is known in the art, the OS/2 operating system 260 incorporates the use of a graphics engine (known as OS2GRE in OS/2 and GDI in Windows). Upon receiving an instruction from, for example, one of applications 290, (example: "draw a window") the operating system will utilize its graphics engine to send a combination of typically smaller, more specific (i.e., low level) instructions by means of graphics primitives (e.g. "draw line", "bitblt" "draw wide border", "draw text", etc.,) to a display driver associated with the particular video display hardware (e.g., I/O 220) is being used within the monitored workstation.

As noted in more detail below, it is these graphics primitives which are interpreted under the present disclosure in order to define localized screen changes. Such screen changes can be due to "on screen typing" (as described in detail below), can be pursuant to manual or automatic user commands (open/close window), or can be other automatic screen changes, such as caused by a blinking cursor or an on-screen clock.

As may be understood, multiple applications 280, 290 may be used by the agent on the workstation 200 to provide service to the customers. These applications can include myriad programs, such as, for example, a web browser, an online help manual, training programs, and scheduling programs, among many others. Because every application is drawing to its own virtual desk top, and is not aware of what the other applications are doing, the graphics engine responds to different requests from the applications, determining what requests should be visible to the end user, and sends those requests as a list of primitives to the video driver.

The general configuration and operation of the operating system 260 such as OS/2 is assumed to be known to one skilled in the art; however, the reference manual "OS/2 2.0 Technical Library—Presentation Driver Reference, Version 2.00", Published by IBM, First Edition, copyright 1992, and subsequent versions thereof, are incorporated herein by reference, including but not limited to the general operation of the OS/2 operating system, the function and operation of graphics primitives generally and individually, and dynamic link library functions (DLLs).

The capturing software generally consists of a capture module and a monitor module (e.g., monitor/capture client 270). The operation of the monitor/capture modules is described in detail in U.S. patent application Ser. No. 10/118, 848, entitled "Improved Method and Apparatus for Simultaneously Monitoring Computer User Screen and Telephone Activity from a Remote Location," which is hereby incorporated by reference in its entirety.

FIG. 3 shows a block diagram of the supervisor workstation. The supervisor workstation can include many of the same components as the agent workstation. The supervisor workstation can include hardware devices such as a processor 310, I/O 320, and memory 330. Each of these hardware devices can communicate with each other via a bus 340. The I/O 320 can include an input interface such as, for example, a keyboard, a mouse, or some other suitable device, an output display interface such as, for example, a monitor 390, a printer, or data communications interface, among others. The memory 330 of the system can include a RAM, ROM, a hard drive, or other suitable storage mechanisms. Also stored in memory 330 can be a number of applications, each of the applications being enabled for execution on the processor 310. In the current example, the memory includes an operating system 360, a record retrieval client 370, and other applications 380.

The record retrieval client 370 can be configured to retrieve records from the call records database via the call center network after the monitor server has stored the call record. The records can be stored and searched according to parameters related to agent information, call information and parameters suitable for searching a call records database and a call center configuration database. The record retrieval client 370 can further replay the records retrieved from the call records database such that a supervisor can review the activities of the selected agent, for example. During replay, the record retrieval client 370 can send the recorded on-screen activities to the display 390 for rendering, while replaying the voice data synchronously via a speaker (not shown) at the supervisor workstation 300. Thus, the conversation between the agent and the contact can be heard while simultaneously viewing the on-screen activities of the agent. This can be particularly useful in providing feedback to the agent by providing critique from the supervisor, providing further training to correct noted mistakes, or for resolving disputes between the contact and the call center, among many others. It should be noted that the record retrieval client 370 could be provided to any of the agents as well. Moreover, it should also be noted that the record retrieval client 370 could be used to monitor data received directly from the agent workstation(s).

Figure 4:
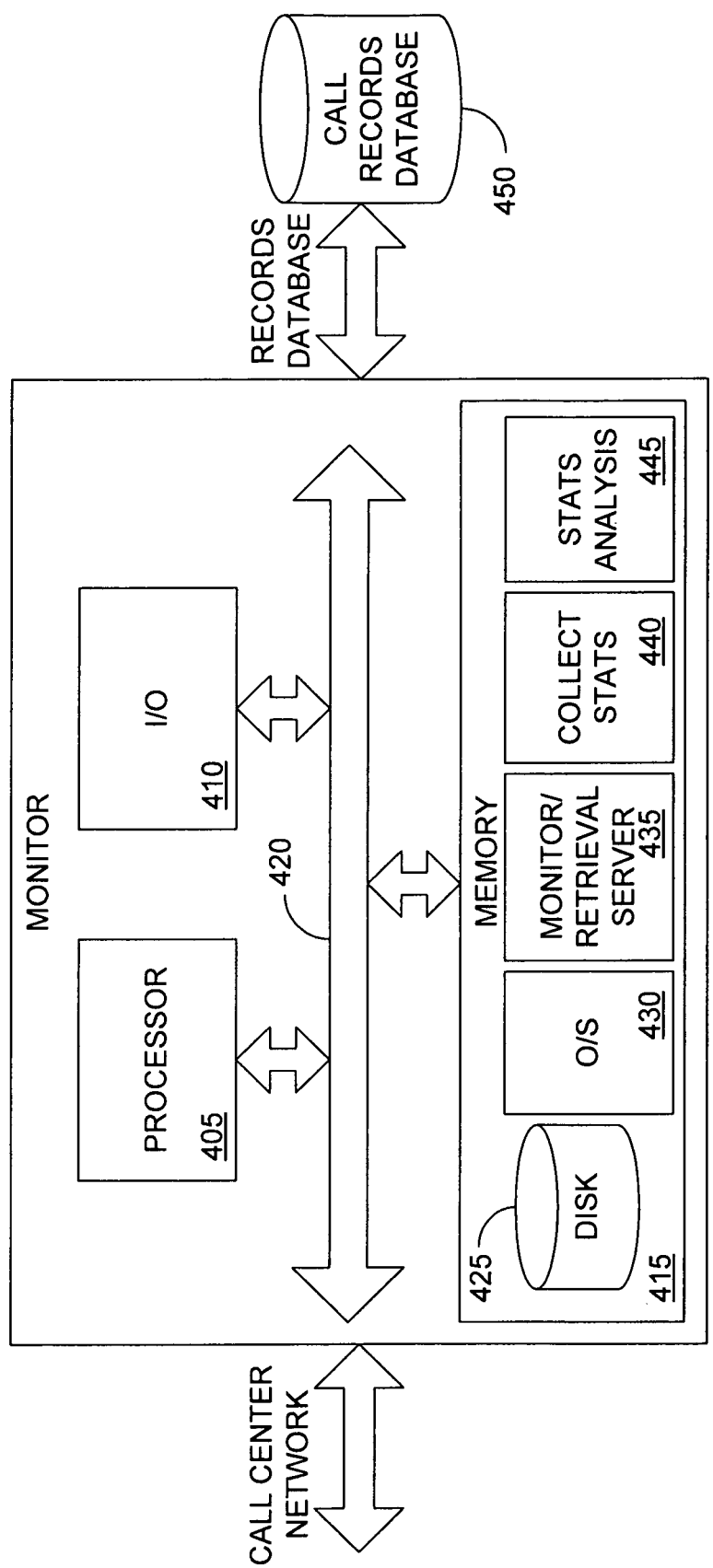
FIG. 4 is a block diagram illustrating a monitor including a complex recording trigger.

FIG. 4 shows a block diagram of a monitor server 400. The monitor server 400 can include a processor 405, I/O 410 and memory 415. Each of these devices are coupled together by a bus 420, which facilitates communications between the processor 405, I/O 410 and memory 415. The processor can be any commercially available processor. The I/O can include an interface for myriad hardware devices. For example, the I/O 410 can include an input interface such as, for example, a keyboard, a mouse, or some other suitable device, an output interface such as, for example, a monitor, a printer, or data communications interface, among others. The memory 415 of the system can include a RAM, ROM, a hard drive, or other suitable storage mechanisms. Also stored in memory 415 can be a number of applications, each of the applications being enabled for execution on the processor 405. In the current example, the memory includes an operating system 430, a monitor/retrieval server 435, a statistics collection module 440, and a statistics analysis module 440. It should also be understood that the memory can further include other applications (not shown). The monitor server 400 can include a call records database 450, which can be located externally to the monitor server 400, internally to the monitor server 400, or a combination thereof. The call records database can be very large, and thus can be implemented in any mode that properly implements a designed storage capacity.

It should be understood that the monitor server 400 operates similarly to the monitor server described in U.S. patent application Ser. No. 11/166,630, entitled "Improved Method and Apparatus for Simultaneously Monitoring Computer User Screen and Telephone Activity from a Remote Location," in order to capture and record data from the agent workstation(s). However, the monitor server 400 additionally includes the functionality to collect statistics on the agent(s) by recording the agent(s) activities for a predetermined period of time using the statistics collection module 440. The predetermined period of time is statistical sampling period which should be long enough for the system to detect any patterns in the behavior of the agent(s). However, it should be understood that the statistics collection module 440 could be unnecessary, if a sufficient statistical sample has been previously compiled and recorded to the call records database 450.

The statistical analysis module 445 can identify patterns in the behavior of an agent, or a group of agents. For example, a particular agent may have a poor demeanor at certain times of the day, or on certain days of the week or month. The statistical analysis can further be used to identify positive behaviors and negative behaviors. Using the identified patterns of behavior, the statistical analysis module 445 can further predict future behavior based upon the statistical analysis of historical behavior. The statistical analysis module 445 can therefore be programmed to look for activity that deviates from an acceptable standard, and attempt to predict when that behavior might occur. Moreover, the statistical analysis module 445 can be further programmed to notify the monitor/retrieval server 435 when a predicted behavior might occur. The monitor/retrieval server 435 can then use this information to make a decision on whether to monitor or record an agent's workstation during the predicted behavior.

It should be noted that the monitor/retrieval server 435 can use other triggers to decide whether to monitor or record an agent's workstation. For example, a scorecard is developed that helps a supervisor evaluate an agent based upon a variety of categories, including, for example, courteousness, skill, system knowledge, areas of expertise, etc. A supervisor or administrator can then set a threshold score, whereby agents meeting the threshold are not monitored, while agents not meeting the threshold are monitored. It should also be understood that the scorecard can be used to trigger monitoring when an agent with a low score in a particular area of expertise is handling calls in that same area of expertise, thereby enabling tighter monitoring of agents that may have trouble handling specific types of calls.

Therefore, the statistics collection module 440 and the statistical analysis module 445 can be used to collect information on a number of agents, and make predictions regarding the agents' behavior. Moreover the predictions can be used to reduce the volume of calls that are monitored by the monitor server 400. This reduction in monitored calls in turn reduces the maximum storage space 450 used by the monitor server 400.

FIG. 5 shows an operational scenario for a monitoring server of the present disclosure. The operational scenario begins at start block 500. At process block 510 the information from the call records database 520 is analyzed. The monitor server can perform this step by retrieving the call records from the call records database 520. The monitor server then reviews the data according to predetermined guidelines for call center operation. The monitor server can review the data for any number of indicators, including, for example, poor language, complaints, training deficiencies, voice amplitude (volume) indicating an agent yelling at a contact or vice-versa, conversions (e.g., making a sale to a contact), unauthorized use of the workstation (e.g., doing personal business or viewing an inappropriate website), poor productivity (as indicated, for example, by low activity or prolonged breaks), etc. It should also be understood that activity data may further be collected by any other application equipped to do so. For example, a workforce management program is often used in conjunction with call centers, and is designed to keep track of training, time and attendance, among others. The statistics collection module could gather statistics from such a workforce management program in addition to the call records database.

At process block 530, the monitor server makes prediction regarding whether to monitor the agents. This prediction is made based upon parameters that can be set by the supervisor. For example, the supervisor could instruct the monitor server to monitor negative events such as customer complaints, workstation misuse, poor attendance, or other inappropriate behavior. In such an instance, the monitor server would be configured to trigger recording of an agent's activities upon receipt of a prediction of negative behavior. It should be noted that the analysis of agent behavior can be further adapted to predict the time and/or date at which a specific agent's workstation should be monitored. The operational scenario ends at terminal block 540.

FIG. 6 shows another operational scenario for a monitor server. The operational scenario begins at start block 600. At process block 610, the monitor server analyzes information from the call records database 620. As noted above, the monitor server can be configured to analyze information from other sources in addition to, or instead of, the call records database.

At process block 630, the monitor server predicts whether the agent(s) implicated by the analysis block 620 should be monitored. If there is a decision not to monitor the agent(s), as determined at decision block 640, the operational scenario ends at terminal block 650. However, if the monitor determines that the agent(s) should be monitored in step 640, the monitor begins collecting information from the agent workstation and records the information, as shown in process block 660. The monitor records the information to the call records database 620. The operational scenario ends at terminal block 650.

FIG. 7 shows yet another operational scenario for the monitor server including a data collection sequence. The operational scenario begins at start block 700. At process block 710, the monitor records the activity of an agent or agents. The monitor can continue to record the activity of an agent until a statistical sampling period has expired, as indicated by decision block 720. The statistical sampling period, as mentioned above, is typically chosen such that the analysis module can determine statistical trends in the agent(s) activities.

At process block 730, the collected information is analyzed by the monitor server. Thus, the monitor server attempts to connect agent activity with behavior of the agent, whereby future activities of the user can be predicted based on behavioral attributes connected to the agent. At process block 740, the monitor can determine whether to monitor the agent(s) based upon the analysis of the agent(s) activities. As described above, the decision regarding whether to monitor the agent(s) can be based on a number of different reasons, each of which is intended to be included within the scope of the present disclosure. The operational scenario ends at terminal block 750.

FIG. 8 shows yet another operational scenario for a monitor server, including a data collection sequence and a monitoring sequence. The operational scenario begins at start block 800. The operational scenario continues at process block 810, where the monitor server monitors agent activities, and records the activities of the agent for analysis. As depicted by decision block 820, the monitor continues to monitor and record agent activities for a sufficient statistical interval.

At process block 830, the collected information is analyzed by the monitor server. Analyzing the collected information, the monitor server attempts to connect agent activity with behavior of the agent, whereby future activities of the user can be predicted based on behavioral attributes connected to the agent. At process block 840, the monitor can determine whether to monitor the agent(s) based upon the analysis of the agent(s) activities. As described above, the decision regarding whether to monitor the agent(s) can be based on a number of different reasons, each of which is intended to be included within the scope of the present disclosure.

As shown by decision block 850, if the monitor server does not predict a monitored activity, the operational scenario ends at terminal block 860. However, if the monitor server predicts a monitored activity, as determined in decision block 850, the monitor server begins to collect an record the agent workstation activities in process block 870. The operational scenario ends at terminal block 860.

The systems and methods data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

While this disclosure has been made with specific detail with reference to the present disclosure it should be understood that many variations and modifications may be effected without departing from the scope of the disclosure as described in the appended claims.

What is claimed is:

1. A selective recording system having a complex recording trigger, the system comprising:
    an activity monitor configured to monitor the activities of agents by recording telephone and on-screen computer activities associated with the agent;
    an activity analyzer configured to analyze historical activities of an agent recorded by the activity monitor, to detect patterns of activities comprising behaviors, to estimate future behaviors of the agent using the detected pattern of behaviors, and establishing a date and time for when the agent is predicted to perform the estimated future behavior;
    wherein the activity analyzer compares the agent's historical activities to schedule information received from a workforce management system as well as compares the agent's historical activities to a historical record of a peer group associated with the agent to determine whether the agent's historical activities are inconsistent with the historical record of the peer group;
    a complex recording trigger configured to:
    receive from the activity analyzer the estimated future behaviors, the established date and time for when the agent is predicted to perform the estimated future behaviors, and the determination whether the agent's activities are inconsistent with the activities of the peer group, and
    determine whether to monitor an agent based upon the received estimated future behaviors, the received established date and time for when the agent is predicted to perform the estimated future behavior, and the received determination whether the agent's historical activities are inconsistent with that historical record of the peer group, the complex recording trigger being further configured to instruct the activity monitor to selectively record the agent's activities based upon the determination whether to monitor the agent; and
    wherein the complex recording trigger can be configured to record future telephone activity, on-screen computer activity, or combinations thereof based upon behaviors that a business selects to monitor.

2. The system of claim 1, wherein the monitored activities collected includes agent history, group history, schedule, temporal information, and forecast information.

3. The system of claim 1, wherein the activity analyzing step comprises comparing current activities of the agent to the agent's own past activities in order to detect patterns in the agent's usage.

4. The system of claim 1, wherein the activity analyzer performs a statistical analysis of the collected information;
    wherein the activity analyzer is configured to estimate time periods during which an agent is found to be likely to engage in a selected activity; and
    wherein the complex recording trigger is further configured to automatically instruct the activity monitor to record the agent's activities based upon the prediction to perform the estimated future behaviors.

5. The system of claim 4, wherein the selected activity includes at least one of: abnormal telephone conversations, inactivity, errors, lost business, or non-compliance with schedule.

6. The system of claim 4, wherein the selected activity includes at least one of a completed sale or transaction, a closed issue, or a positive contact exchange.

7. A method for predicting a period of time during which to monitor an agent for statistically anomalous conversations, the method comprising the steps of:
    analyzing an agent based upon information collected about the agent, wherein at least a portion of the information is based upon information collected over a monitored medium, the analyzing further comprising detecting patterns of activities comprising behaviors, estimating future behavior of the agent using the detected pattern of behaviors, and establishing a date and time for when the agent is predicted to perform the estimated future behavior;
    determining whether the agent should be monitored based upon comparing the agent's historical activities to schedule information received from a workforce management system, comparing the agent's historical activities to a historical record of a peer group associated with the agent, the established date and time for when the agent is predicted to perform the estimated future behaviors, and a determination whether the agent's historical activities are inconsistent with the historical record of the peer group; and
    monitoring activities associated with the agent based upon determining that future activity of the agent has deviated from the estimate of the agent's future behavior, wherein monitoring includes recording data associated with the agent's telephone and computer usage, and marking the recorded data for review.

8. The method of claim 7, wherein the information collected includes agent history, group history, schedule, temporal information, forecast information, scorecard information, evaluation or quality score.

9. The method of claim 7, wherein the step of determining whether the agent should be monitored comprises determining when the agent should be monitored.

10. The method of claim 7, further comprising the step of:
    collecting information about current activities being performed by an agent over a predetermined period of time by recording information from the monitored medium;
    wherein the analyzing step compares the collected information with scheduling information received from a workforce management system as well as comparing the collected information with usage information of a peer group with whom the agent is associated.

11. The method of claim 10, wherein the analyzing step comprises comparing current activities of the agent to the agent's own past behavior.

12. The method of claim 10, wherein the collecting step further comprises collecting usage information about the peer group's activities wherein the peer group comprises a plurality of agents.

13. The method of claim 7, wherein the analyzing step comprises a statistical analysis of the collected information;
    wherein the determining step further comprises estimating statistically anomalous future activity;
    wherein the method further comprises the step of automatically recording the agent's activities based upon the determining step.

14. The method of claim 13, wherein the statistically anomalous future activity includes at least one of: abnormal telephone conversations, inactivity, errors, lost business, abnormal web browsing, or abnormal use of a business application at the workstation.

* * * * *